United States Patent [19]
Roth

[11] Patent Number: 5,170,493
[45] Date of Patent: Dec. 8, 1992

[54] COMBINED LOW FREQUENCY RECEIVE AND HIGH FREQUENCY TRANSCEIVE ANTENNA SYSTEM AND METHOD

[75] Inventor: Stephen A. Roth, Aumsville, Oreg.

[73] Assignee: IIMorrow, Inc., Salem, Oreg.

[21] Appl. No.: 223,911

[22] Filed: Jul. 25, 1988

[51] Int. Cl.[5] .......................... H04B 1/46; H04B 1/18
[52] U.S. Cl. ........................................ 455/82; 455/83; 455/282; 455/291; 333/126; 333/132
[58] Field of Search ................. 455/78, 80, 82–83, 455/142–143, 282, 291; 333/126, 129, 132, 134; 343/858, 861; 342/57–58, 388, 389, 55

[56] References Cited
U.S. PATENT DOCUMENTS

| | | | |
|---|---|---|---|
| 3,725,942 | 4/1973 | Ukmar | 343/858 |
| 3,739,390 | 6/1973 | Poppe, Jr. et al. | 343/853 |
| 4,037,177 | 6/1977 | Tyrey | 455/83 |
| 4,085,405 | 4/1978 | Barlow | 333/129 |
| 4,095,229 | 6/1978 | Elliot | 455/142 |
| 4,134,117 | 1/1979 | Robinson et al. | 342/389 |
| 4,141,016 | 2/1979 | Nelson | 343/858 |

Primary Examiner—Reinhard J. Eisenzopf
Assistant Examiner—Andrew Faile
Attorney, Agent, or Firm—William A. Birdwell & Associates

[57] ABSTRACT

A dual function antenna system and method. A system is provided for using a single antenna for both the reception of low frequency navigational signals, such as LORAN-C, and high frequency communications signals in the VHF region. The antenna is at a remote location from a low frequency receiver and a high frequency transceiver. Both the low frequency and the high frequency signals are coupled to the receiver and transceiver, respectively, over the same transmission line at one end thereof. A preamplifier is provided at the location of the antenna to increase the strength of the low frequency signal applied to the transmission line. A high pass filter is provided to couple the antenna and the transmission line and prevent feedback from the output of the preamplifier from reaching its input. The other end of the transmission line is coupled to the high frequency transceiver by a high pass filter, and to the low frequency receiver by a low pass filter. The preamplifier is supplied with DC power over the transmission line, and includes a current regulator so that the preamplifier may be used with a wide range of supply voltages.

45 Claims, 4 Drawing Sheets

COMBINED LOW FREQUENCY RECEIVE AND HIGH FREQUENCY TRANSCEIVE ANTENNA SYSTEM AND METHOD

BACKGROUND OF THE INVENTION

This invention relates to radio antenna systems and methods, particularly antenna systems and methods for enabling one antenna to transmit a high frequency radio signal and simultaneously receive a low frequency radio signal.

In vehicles, such as automobiles or airplanes, it is often desirable or necessary to employ both radio navigation and radio communications equipment. A common type of radio navigation is a system known as LORAN, which works by receiving at a vehicle encoded low frequency radio signals transmitted from fixed locations, based upon which the vehicle's position can be computed. LORAN-C is the LORAN system currently in predominate use, and its signals are broadcast at a carrier frequency of 100 kilohertz ("kHz").

In contrast, two-way radio communications with land and air vehicles typically employ VHF frequencies in the VHF band. VHF carrier frequencies range from about 30 megahertz ("MHz") up to about 300 MHz. Typically, a vehicle would carry a VHF radio frequency transceiver. It is often desirable for the vehicle operator simultaneously to be receiving LORAN signals for navigation and to be transmitting or receiving VHF signals for communication.

Notwithstanding the considerable difference in frequency of LORAN and VHF signals, it is often desirable to employ the same antenna on a vehicle both to receive low frequency LORAN signals and to transmit or receive VHF communication signals. Moreover, it is ordinarily desirable that the antenna be relatively short, on the order of about 20 inches. In the case of an automobile one reason is to minimize the obtrusiveness of the antenna. This may be because the user does not want an unsightly antenna on the car, because some degree of concealment of the antenna may be important to law enforcement agencies, or simply to avoid attracting the attention of persons who may be tempted to steal expensive electronic equipment within the vehicle. In the case of an airplane, the use of a single, short antenna contributes to the operation of the airplane by minimizing the number and size of protrusions from the airplane so as to decrease drag. It is also important to minimize the number of items that would otherwise contribute unnecessary weight to the aircraft. Thence, it is desirable to use a single, relatively short antenna both to receive low frequency navigation signals, such as LORAN, and simultaneously transmit or receive high frequency, typically VHF, radio communications.

There are some serious obstacles to achieving the foregoing objective. In many vehicles, particularly in aircraft, the antenna must be located some distance from the LORAN receiver and from a VHF transceiver. For example, the antenna would typically be located on the top of an airplane fuselage, while the LORAN navigation equipment and VHF transceiver would be located in the cockpit. Ordinarily, this would require two separate transmission lines between the antenna and the radio electronics, which is not only inconvenient but contributes undesired weight to the aircraft. Another significant problem is that, while VHF signals have wavelengths not too much greater than such a short antenna as a result of which the antenna has a relatively low impedance at VHF frequencies, the wavelength of LORAN signals is much longer than the antenna, so that the antenna has a very high impedance at low, LORAN signal frequencies. This means that it is relatively easy to match the antenna to the VHF transceiver for maximum transfer of power, but that it is difficult to do so for a LORAN signal. Consequently, use of a short antenna to receive LORAN signals will ordinarily result in a low signal-to-noise ratio.

Use of a single antenna both for transmitting VHF communications and receiving LORAN must also be accomplished such that the transmitted VHF signal does not damage, or even overload, the input of the LORAN receiver. Also, such an antenna should be versatile, so that it can be used with a variety of electronic equipment.

A number of systems for employing the same antenna to both receive relatively low frequency radio signals and to transmit or receive relatively high frequency radio signals have been developed. Such systems are disclosed, for example, in Tanner, et al. U.S. Pat. No. 4,268,805; Elliott, U.S. Pat. No. 4,095,229; and Tyrey, U.S. Pat. No. 4,037,177. However, in each of these either the radio equipment would have to be located relatively close to the antenna, or more than one transmission line would be required to connect low and high frequency matching networks to the radio equipment. Moreover, none of these systems deals with the simultaneous use of LORAN reception and VHF transmission. Powell, et al. U.S. Pat. No. 3,812,494 discloses a system for receiving and transmitting Doppler frequencies and telemetering frequencies simultaneously over the same antenna, as distinguished from low frequency LORAN and VHF frequencies, and employs an impedance matching network in close proximity with the antenna itself. Duncan, Jr., et al. U.S. Pat. No. 3,217,273 discloses a system for coupling several transmitters and receivers to a single antenna, while avoiding the radiation of spurious signals resulting from intermodulation, and avoiding swamping the receivers. In addition, LORAN antenna systems which employ a current regulated preamplifier located at a remote antenna, and powered by DC current provided over the antenna-to-receiver transmission line, to prevent reduction of the signal-to-noise ratio between the antenna and the LORAN receiver have previously been used. However, none of these systems solves the aforementioned problems associated with employing a relatively short antenna disposed some distance away from LORAN and VHF communications equipment both to receive LORAN signals and transmit or receive VHF communications simultaneously.

SUMMARY OF THE INVENTION

The present invention provides a dual-purpose antenna system which overcomes the aforementioned obstacles. A relatively short antenna is coupled to one end of a transmission line through a split coupling circuit proximate the antenna. One path of the split circuit is for receiving low frequency, LORAN signals and coupling them to the transmission line. It includes a preamplifier for amplifying the received signals before they are applied to the transmission line to prevent reduction of the signal-to-noise ratio between the antenna and a LORAN receiver, and a low frequency input band pass filter. This filter both blocks signals present at the antenna outside the necessary band pass from reaching the preamplifier and matches the impedance of the short antenna to the input impedance of the preamplifier at about 100 kHz. The second path of the split circuit couples VHF signals on the transmission line to the antenna and vice versa. It employs a band pass filter which allows VHF signals of about 150 MHz to pass, but blocks low frequency LORAN signals, and may also perform an impedance matching function.

The system also includes, at the other end of the transmission line, a low pass filter for coupling the LORAN signals from the transmission line to the LORAN receiver, and a high pass filter for coupling VHF signals from the transmission line to a VHF transceiver, and vice versa. Thus, the low frequency and high frequency signal paths split at the antenna, are recombined at one end of a transmission line, and split at the other end of the transmission line for connection to the radio equipment.

The preamplifier at the antenna is powered by direct current ("DC") supplied over the transmission line. The preamplifier is provided with a current regulation circuit so that the antenna can be used with various LORAN equipment that apply different voltages.

The input band pass filter of the preamplifier and the VHF band pass filter in the split coupling circuit are both designed to minimize shunt capacitance at the antenna, so as to minimize attenuation of the LORAN signal. Advantage is taken of distributed reactance of the antenna and of the circuit elements in these filters to achieve the desired impedance matching and filtering characteristics with minimal attenuation of LORAN signals.

Accordingly, it is a principal objective of the present invention to provide a novel and improved antenna system and method whereby a single, relatively short antenna can be used both to receive low frequency radio signals and to transmit high frequency radio signals simultaneously.

It is another objective of the present invention to provide a system and method for coupling a single radio antenna to a high frequency radio transmitter and a low frequency radio receiver over the same transmission line so that high frequency radio signals may be transmitted and low frequency radio signals may be received simultaneously.

It is another objective of the present invention to provide such a coupling system and method which includes preamplification of the low frequency signals prior to their application to the transmission line so as to prevent further reduction of their already low signal-to-noise ratio.

It is another objective of the present invention to provide such a coupling system and method wherein the impedance of the antenna at low frequencies is matched through one signal path to the transmission line and the impedance of the antenna at high frequencies is matched through another signal path to the transmission line.

It is a further objective of the present invention to provide for an antenna system and method wherein a relatively short antenna at a location remote from a LORAN receiver and a VHF transceiver is coupled by one transmission line to both the LORAN receiver and the VHF receiver.

The foregoing and other objectives, features, and advantages of the present invention will be more readily understood upon consideration of the following detailed description of the invention, taken in conjunction with the accompanying drawings.

DESCRIPTION OF THE PREFERRED EMBODIMENT

Figure 1:
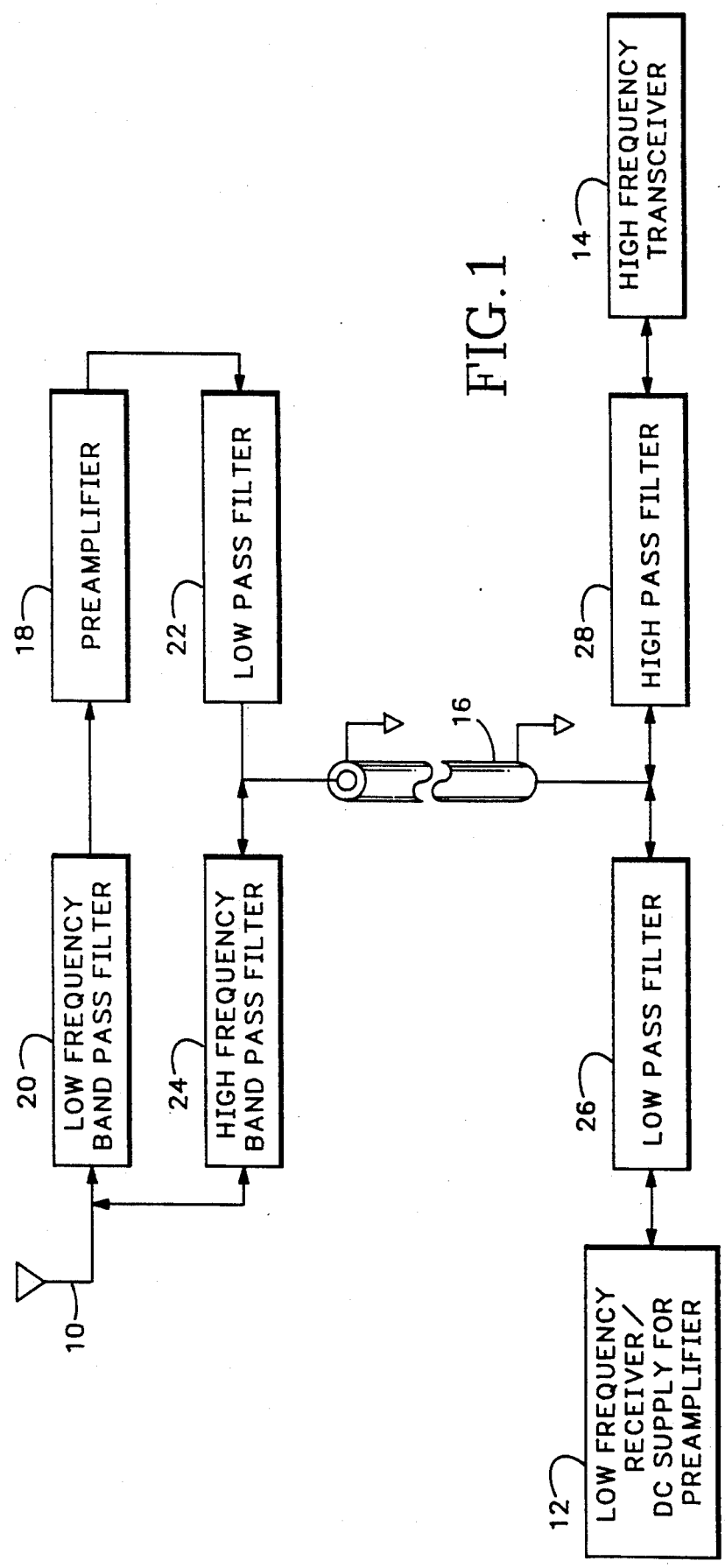
FIG. 1 is a block diagram of a preferred embodiment of an antenna system according to the present invention.

In FIG. 1, which shows a block diagram of the preferred embodiment of the invention, a relatively short antenna 10 is coupled to a low frequency receiver 12 and a high frequency transceiver 14. The antenna may be used simultaneously to receive low frequency radio signals and transmit or receive high frequency radio signals. The system is particularly adapted to receive navigational signals, such as LORAN-C, which are transmitted at about 100 kHz±10 kHz, and to simultaneously transmit or receive VHF communication signals, transmitted at about 150 MHz±2.5 MHz. However, it should be recognized that the invention might be employed in other applications as well.

The antenna 10 would typically be mounted on a vehicle, such as an automobile or an aircraft, in which a VHF transceiver is employed for communications and a LORAN receiver is used for navigation. The antenna would preferably be about 20 inches in length. At that length, the antenna would be relatively unobtrusive, can be made relatively lightweight, would produce little air drag, and would present an essentially resistive termination impedance of about 50 ohms at 150 MHz. On the other hand, it would present an impedance of about 200 kohms, with a significant capacitive reactance component, at 100 kHz.

The antenna 10 would ordinarily be mounted on the outside of a vehicle at some distance from the receiver 12 and the transceiver 14, so a transmission line 16, typically a length of 50 ohm coaxial cable, is employed to connect the antenna to the receiver and transceiver. The low frequency LORAN-C signals and the VHF communications signals are coupled to and from the antenna over the same transmission line 16.

Since the signal strength of the LORAN signals is relatively low to begin with, and the impedance of the antenna is very high at 100 kHz, the amplitude of the LORAN signals presented by the antenna can be very low, on the order of a few ten's of microvolts. To prevent these signal from being totally obscured by noise by the time they reach the receiver 12, a preamplifier 18 is provided to increase the signal level before the LORAN signals are applied to the transmission line 16.

The preamplifier 18 is preceded by a low frequency band pass filter 20, which allows only frequencies of about 100 kHz±25 kHz to pass, and matches the impedance of the antenna 10 to the input impedance of the preamplifier. The band pass filter 20 thereby provides for maximum transfer of LORAN signal power from the antenna to the receiver, while preventing unwanted signals present at the antenna, particularly the relatively high power VHF signals produced by the transceiver 14 which would overload and possibly damage the preamplifier 18, from reaching the input of the preamplifier.

A low pass filter 22 is disposed between the output of the preamplifier 18 and the transmission line 16. The low pass filter allows the low frequency signals picked up by the antenna and amplified by the preamplifier to be coupled to the transmission line while preventing the relatively high power VHF signals produced by the transceiver 14 from reaching the preamplifier through its output circuitry. It also allows DC power to be provided to the preamplifier, as is explained below.

VHF communications signals are coupled between the antenna 10 and the transmission line 16 by a high frequency band pass filter 24. The high frequency band pass filter permits signals of about 150 MHz±2.5 MHz to pass from the antenna to the transmission line with a good impedance match and vice versa, while preventing the low frequency signals amplified by the preamplifier 18 from being applied to the input of the low frequency band pass filter, which would otherwise produce undesirable feedback. In addition, the high frequency band pass filter minimizes the shunt capacitance applied to the antenna 10 so as to minimize the attenuating affect that it has on the low frequency signals picked up by the antenna, as is explained below.

At the end of the transmission line 16 closest to the receiver 12 and the transceiver 14, a low pass filter 26 is provided to couple the transmission line to the receiver and a high pass filter 28 is provided to couple the transceiver to the transmission line. The low pass filter 26 permits low frequency navigation signals to pass from the transmission line to the input of the receiver 12 and DC power to pass from the receiver to the transmission line, while preventing relatively high power VHF signals from reaching, and overloading, the LORAN receiver. The high pass filter 28 permits the high frequency communication signals to pass between the transmission line 16 and the VHF transceiver, while blocking the low frequency signals and thereby preventing them from being unnecessarily attenuated by the transceiver input.

Figure 2:
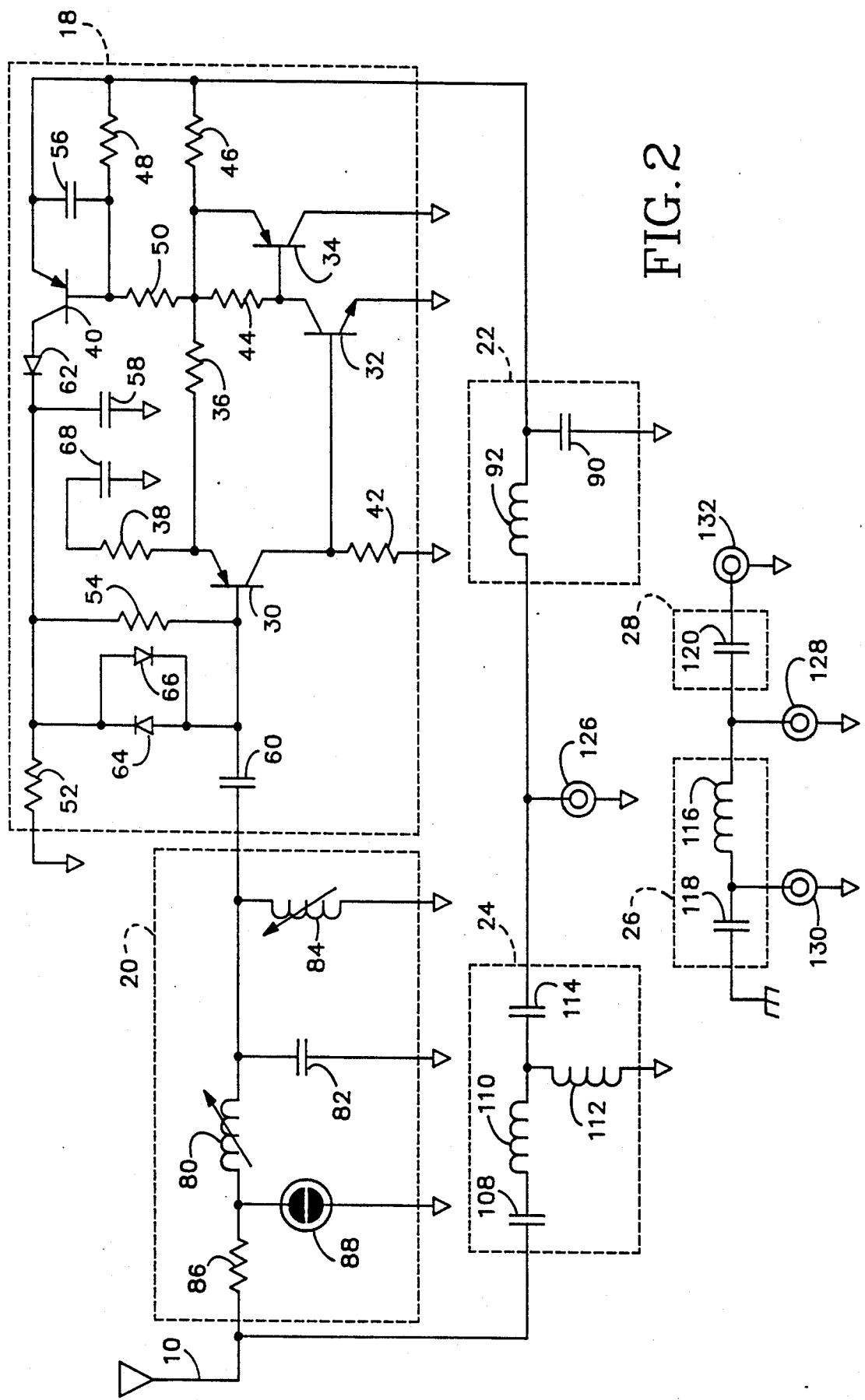
FIG. 2 is a schematic diagram of a preferred embodiment of an antenna system according to the present invention.

Turning now to FIG. 2 the preamplifier 18 is a low-noise amplifier presenting an input impedance to the low frequency band pass filter 20 of about 33 kohms and an output impedance to low pass filter 22 of about 50 ohms at approximately 100 kHz. In the preamplifier, transistors 30, 32, and 34 are configured as a noninverting operational amplifier whose alternating current ("AC") voltage gain is determined by resistors 36 (4.7 kohms) and 38 (1 kohms). Transistor 40 is provided to regulate the current in the amplifier.

In the three-stage amplifier represented by transistors 30, 32, and 34, the operating point of each of those transistors is set by resistors 42 (15 kohms), 44 (1 kohms) and 46 (47 ohms), together with the current regulator circuitry. The voltage across resistor 46 is detected, divided, and applied to the base of transistor 40 by resistor 48 (27 kohms) and resistor 50 (15 kohms) so as to regulate the current drawn by the amplifier to maintain a substantially constant DC voltage across resistor 46. That is accomplished by transistor 40, which reflects any change in voltage as a change in current through resistor 52 (390 kohms), which adjusts the voltage at the base of transistor 30 and, hence, the voltage across resistor 46.

Although there is a resistor 54 (33 kohms) between resistor 52 and the base of transistor 30, to set the input impedance of the amplifier as is explained below, very little DC flows through resistor 54. Similarly, very little DC flows through resistor 36. Since the DC voltage drop across resistors 54 and 36 is essentially constant, and since the base-emitter voltage of transistor 30 is essentially constant, the change in voltage across resistor 52 caused by corresponding changes in the current through that resistor, adjusts the voltage across resistor 46.

Capacitor 56 (47 nanofarads) acts as a low pass filter with respect to the AC signal to be amplified; that is, it prevents any of the AC signal from appearing across the base emitter junction of transistor 40, which would be amplified and modulate the current regulation signal. Similarly, capacitor 58 (47 nanofarads) acts as a low pass filter; that is, it shunts to ground the AC signal that would otherwise appear at the collector of the current regulator transistor 40. Diode 62 is placed in the collector circuit of transistor 40 to prevent the collector-base junction from becoming reverse biased, as that would create AC instability of the current regulation circuit. The current regulation circuit allows the amplifier to operate in response to a DC supply voltage ranging from about 3.5 volts up to about 20 volts while maintaining the current operating point of the amplifier substantially constant.

From an AC standpoint, the preamplifier 18 is coupled to the band pass filter 20 by capacitor 60 (220 picofarads). It operates essentially as a blocking capacitor and has minimal affect on the transfer characteristics of the band pass filter 20 or the input impedance of the preamplifier. The input impedance of the preamplifier is, in fact, set by resistor 54. It is chosen so as to maximize the signal-to-noise ratio at the input of the preamplifier. To that end, it is selected to be substantially equal to the ratio of the equivalent noise voltage divided by the equivalent noise current at the input of the amplifier.

Diodes 64 and 66 are provided for limiting the amplitude of the input signal to the preamplifier. While the low frequency navigation signals which the preamplifier is intended to amplify would not ordinarily exceed the limit established by these diodes, other spurious signals may exceed that limit, so the diodes provide protection against them.

The AC gain of the amplifier is substantially equal to 1 plus the ratio of value of resistor 36 to the value of resistor 38. In this case that is 5.7. This is because the amplifier is configured as an operational amplifier; that is, the open loop gain of the three-stage amplifier represented by transistors 30, 32, and 34 is very high in relationship to the gain determined by resistors 36 and 38. Capacitor 68 (47 nanofarads) blocks DC, but allows AC to flow to ground. The output impedance of the amplifier is set primarily by resistor 46 and to some extent by the output impedance of the three transistor operational amplifier. Together they provide an output impedance of substantially 50 ohms, which matches the impedance of the transmission line 16.

The low frequency band pass filter 20, connected to the antenna 10, performs the functions of both matching the antenna impedance to the input impedance of the preamplifier 18, and of preventing unwanted signals present at the antenna from reaching the input of the preamplifier. Such unwanted signals include signals above and below the LORAN frequency which are picked up by the antenna, as well as the relatively powerful high frequency signals supplied to the antenna by the VHF transceiver.

Figure 3:
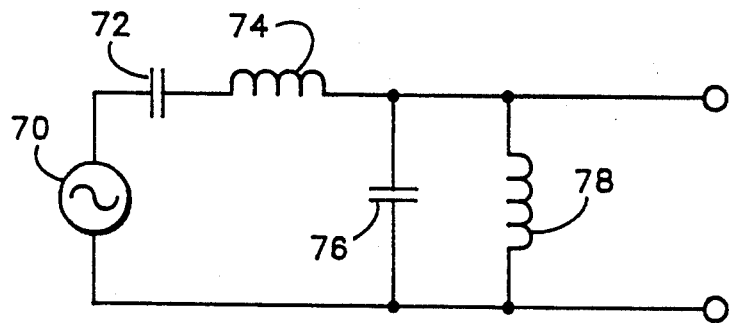
FIG. 3 is a schematic diagram of an equivalent circuit for a low frequency band pass filter according to the present invention.

The impedance matching and filtering characteristics of the low frequency band pass filter are best explained with respect to the substantially equivalent circuit diagram shown in FIG. 3. In that diagram the signal detected at the antenna is represented by voltage generator 70 and the source impedance of the antenna is represented by capacitor 72. The band pass circuit is a Butterworth filter formed by the distributed capacitance of the antenna, represented by capacitor 72, a series inductance 74, a shunt capacitance 76, and a shunt inductance 78. The design of a Butterworth filter is well understood by persons of ordinary skill in the art.

In FIG. 2, the inductance 74, capacitance 76, and inductance 78 are represented as discreet components by variable inductor 80 (nominally 119 millihenries), capacitor 82 (39 picofarads), and variable inductor 84 (nominally 34 millihenries), respectively. The variable inductors are used to adjust the band pass characteristics of the filter. Resistor 86 (4.7 kohms) is employed in series with inductor 80 to present a high input resistance to high frequency signals present at the antenna and to any DC current that might be applied to the antenna. The neon lamp 88 provides yet further protection to the input of the preamplifier by limiting the input voltage, particularly by limiting the maximum voltage that can be applied to the input of the preamplifier in the face of large voltage transients, such as lighting strikes and the like. It should be recognized that the component values are representative only and that the actual values used for a given embodiment of the invention may be different depending on the distributed reactances of the discrete components and the physical arrangement thereof.

The low pass filter 22, which couples the output of the preamplifier 18 to the transmission line 16, is a two pole low pass filter comprising shunt capacitor 90 (180 picofarads) and series inductor 92 (10 microhenries). This couples the approximately 50 ohm output impedance of the preamplifier 18 to the 50 ohm impedance of the transmission line 16, permits low frequency navigation signals to be applied by the preamplifier to the transmission line, permits DC power to be applied from the transmission line to the preamplifier, and blocks high frequency communication signals from being coupled from the transmission line to the preamplifier through the output stage of the preamplifier.

Figure 4:
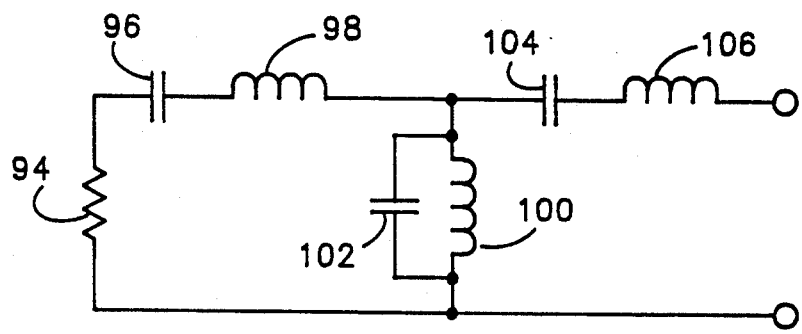
FIG. 4 is a schematic diagram of an equivalent circuit for a high frequency band pass filter according to the present invention.

The high frequency band pass filter 24 is best explained first with respect to FIG. 4. At 150 MHz, the antenna presents an essentially resistive 50 ohm impedance represented by resistor 94, to which the impedance of the filter is to be matched. However, to prevent significant attenuation of received LORAN signals at the antenna, the filter must present a relatively high impedance at 100 kHz. This is accomplished by capacitance 96. Since the reactance of capacitance 96 is unwanted at 150 MHz, inductance 98 is employed to cancel it out. These two reactances make the filter a band pass filter rather than a high pass filter.

Filter 24 utilizes distributed reactances as well as discreet elements. Capacitance 96 and inductance 98 form a series resonant circuit. Inductance 100 and the distributed capacitance 102 associated with the corresponding discreet inductor form a parallel, shunt resonant circuit. Capacitance 104 and the inductance in the leads of the corresponding discreet capacitance, represented by inductance 106, form another series resonant circuit. Together with the antenna 10, these reactances provide a relatively flat frequency response and good impedance match to the transmission line 16 over a frequency range of approximately 150 MHz±2.5 MHz.

In FIG. 2, capacitance 96 is represented by capacitor 108 (3.9 picofarads), inductance 98 is represented by inductor 110 (280 nanohenries), inductance 100 and capacitance 102 are represented by inductor 112 (10 nanohenries), and capacitance 104 and inductance 106 are represented by capacitor 114 (56 picofarads), respectively. Since inductors 110 and 112 essentially present a short to ground at the low frequency of 100 kHz, a relatively low value is needed for capacitor 108, so as to minimize attenuation of low frequency navigation signals detected by the antenna. Capacitor 114, together with the rest of the components of the filter, prevents low frequency signals amplified by the preamplifier from being fed back to the antenna and then to the input of the preamplifier, and also prevents DC power from being shorted to ground.

At the other end of the transmission line 16, which is terminated at its ends by connectors 126 and 128, the low pass filter 26 for coupling the transmission line to the LORAN receiver is a single pole low pass filter comprising inductor 116 (3.9 microhenries) and capacitor 118 (82 picofarads). It is connected to the receiver by connector 130. The high pass filter 28 coupling the transmission line to the VHF transceiver comprises capacitor 120 (56 picofarads) which, together with its lead inductance, is a single stage band pass filter. Capacitor 120 blocks DC power provided by the LORAN receiver to the preamplifier and low frequency signals present on the transmission line 16 from reaching the antenna connection of the VHF transceiver. The high pass filter is connected to the VHF transceiver by connector 132.

Figure 5:
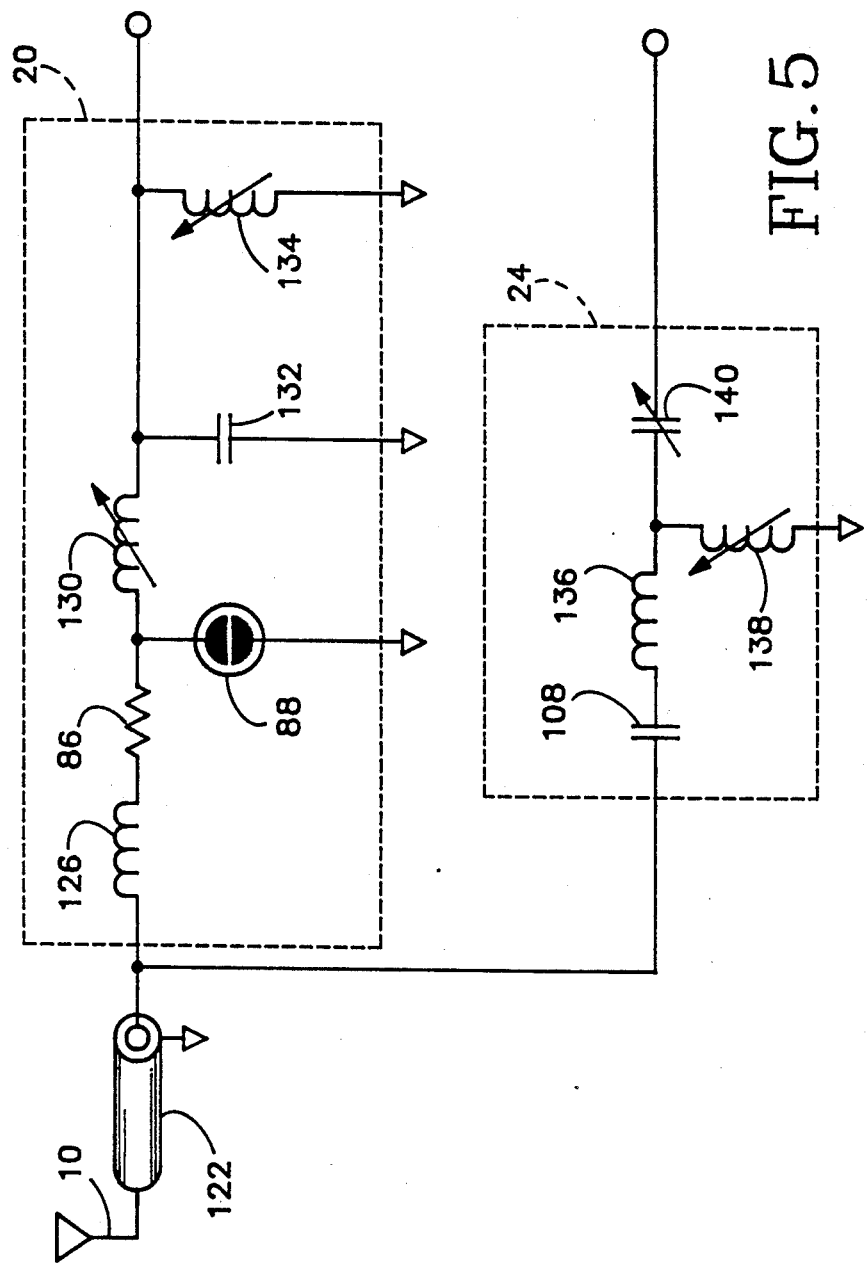
FIG. 5 is a schematic diagram of an alternative embodiment of an antenna system according to the present invention.

An alternative embodiment of the invention is shown in FIG. 5. In this case, the general configuration is the same as in the aforedescribed embodiment except that the antenna 10 is connected to the low frequency band pass filter 20 and to the high frequency band pass filter 24 by a short length of transmission line 122, typically about 4.5 inches long and having a characteristic impedance of 75 ohms. Such an embodiment is used, for example, where it is undesirable to have any portion of the antenna system except for the antenna itself protruding from the surface of the vehicle. This requires that the filters and preamplifier be placed beneath the surface of the vehicle, which requires that a short length of transmission line be disposed between the base of the antenna and the input to the system.

Figure 6:
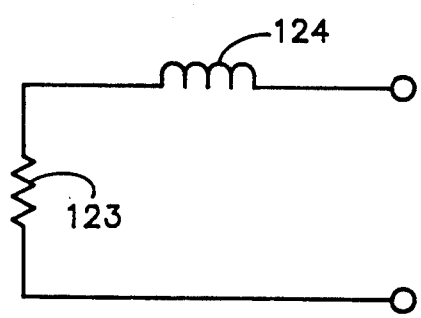
FIG. 6 is a schematic diagram of an exemplary equivalent circuit for an antenna having a short length of transmission line connected thereto.

The effect of the transmission line 122 depends upon various factors, primarily the length of the transmission line 122, the length of the antenna 10, the signal frequency, and the characteristic impedance of the transmission line 122. But in the example given, the distributed shunt capacitance of the antenna is increased at low frequencies and the antenna has a predominately inductive reactance characteristic at high frequencies. As shown in FIG. 6, which represents the equivalent circuit of the antenna and short transmission line at high frequencies, the resistance 123 represents the resistive component of the antenna and the inductance 124 represents the source reactance of the antenna at VHF frequencies.

To compensate for the increased distributed shunt capacitance of the antenna 10 and transmission line 122, the values of the discreet components of the low frequency band pass filter are changed. As shown in FIG. 5, a different inductor 130 (73 millihenries), capacitor 132 (82 picofarads), and inductor 134 (17 millihenries) are provided. Because the transmission line 122 causes the voltage of the transmitted VHF signal to be relatively high at the input to the low frequency band pass filter 20, inductor 126 is added to protect the rest of the filter and the input to the preamplifier. Inductor 126, together with its distributed capacitance, acts as a choke at 150 MHz, which substantially prevents the VHF signal from passing to the rest of the low frequency input circuit. It has been found that these components will provide an appropriate match of the impedance at the end of the transmission line 122 to the input impedance of the preamplifier 18, though it is to be understood that in a given embodiment the actual values will depend upon the distributed reactances in the circuit.

Similarly, to compensate for the reactance characteristic of the combined antenna 10 and transmission line 122 at high frequencies the values of the components in the high frequency band pass filter are changed. Indeed, in this embodiment the high frequency band pass filter also has as an important function matching the impedance at the end of the transmission line 122 to the impedance of transmission line 16. Thus, as shown in FIG. 5, a different inductor 136 (358 nonohenries), inductor 138 (338 nanohenries), and capacitor 140 (2-14 picofarads, variable) are provided. It has been found that these components provide a proper match of the impedance at the end of the transmission line 122 to the 50 ohm impedance of the transmission line 16.

Although the embodiments shown in the foregoing description are directed specifically to the simultaneous reception of LORAN-C signals at about 100 kHz and the transmission or reception of VHF communication signals at about 150 MHz, it is to be recognized that other frequencies may be used for other purposes, without departing from the principles of this invention. In addition, while specific component values have been given in this description, it is to be recognized that other component values might be used, particularly for different frequency bands, without departing from the principles of this invention.

The terms and expressions which have been employed in the foregoing specification are used herein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for coupling a radio antenna to a high frequency transmitter and a low frequency receiver over the same first transmission line so that said antenna may be simultaneously used to transmit high frequency signals and receive low frequency signals, comprising:
   (a) preamplifier means for connecting said antenna to said first transmission line, amplifying low frequency signals present at said antenna, and applying said low frequency signals, as amplified, to said first transmission line, said preamplifier means having an input port for receiving signals to be amplified and an output port for outputting amplified signals; and
   (b) high frequency path means for coupling high frequency signals present on said first transmission line to said antenna without coupling to said antenna said low frequency signals applied to said first transmission line by said preamplifier so as to prevent feedback of low frequency signals output at said output port of said preamplifier to said input port thereof.

2. The system of claim 1, wherein said preamplifier means has an input port for receiving signals to be amplified and an output port for outputting amplified signals, said system further comprising low frequency input network means, disposed between said antenna and said input port of said preamplifier means, for substantially matching the impedance of said antenna to the impedance of said preamplifier means at said input port at the frequency of said low frequency signals.

3. The system of claim 2, wherein said preamplifier means comprises amplifier means, disposed between said input port and said output port, for amplifying signals applied to said input port, and current regulator means for supplying substantially constant current DC power to said amplifier means.

4. The system of claim 3, wherein said preamplifier means further comprises means for receiving DC power for said amplifier means at said output port and applying said DC power to said amplifier means through said current regulator means.

5. The system of claim 2, wherein said low frequency input network means comprises band pass filter means for limiting the range of frequencies which can be coupled from said antenna to said input port of said preamplifier means to a predetermined range of frequencies corresponding to said low frequency signals.

6. The system of claim 5, wherein said low frequency input network means comprises a filter whose elements include the distributed reactance of said antenna.

7. The system of claim 5, wherein said low frequency signals are LORAN-C navigation signals and said low frequency input network means has a band pass characteristic of approximately 100 kHz±25 kHz.

8. The system of claim 1 further comprising low pass filter means, connected to said first transmission line, for coupling said low frequency signals, as amplified, from said first transmission line to a low frequency receiver, and high pass filter means, connected to said first transmission line, for coupling said high frequency signals from said transmitter to said first transmission line.

9. A method for coupling a radio antenna to a high frequency transmitter and a low frequency receiver over the same first transmission line so that said antenna may be simultaneously used to transmit high frequency signals and receive low frequency signals, comprising:
   (a) amplifying low frequency signals present at said antenna and applying said low frequency signals, as amplified, to said first transmission line; and
   (b) coupling high frequency signals present on said first transmission line to said antenna without coupling to said antenna said amplified low frequency signals applied to said first transmission line thereby preventing said amplified low frequency signals from producing feedback and concommitant instability.

10. The method of claim 9, further comprising coupling high frequency signals present on said first transmission line to said antenna and vice versa without substantially attenuating low frequency signals present on said antenna.

11. The method of claim 9 wherein said amplifying step includes matching the impedance of said antenna to the impedance of said first transmission line at the frequency of said low frequency signals.

12. The method of claim 9, further comprising employing an amplifier in said amplifying step and matching the impedance of said antenna to the input impedance of said amplifier at the frequency of said low frequency signals.

13. The method of claim 9, further comprising coupling high frequency signals from said transmitter to said first transmission line without substantially attenuating low frequency signals present on said first transmission line.

14. The method of claim 9, further comprising coupling low frequency signals present on said first transmission line to said receiver, without coupling high frequency signals present on said transmission line to said receiver.

15. A system for coupling a radio antenna to a high frequency transmitter and a low frequency receiver over the same first transmission line so that said antenna may be simultaneously used to transmit high frequency signals and receive low frequency signals, comprising:
  (a) preamplifier means for connecting said antenna to said first transmission line, amplifying low frequency signals present at said antenna, and applying said low frequency signals, as amplified, to said first transmission line, said preamplifier means having an input port for receiving signals to be amplified and an output port for outputting amplified signals;
  (b) low frequency input network means, disposed between said antenna and said input port of said preamplifier means, for substantially matching the impedance of said antenna to the impedance of said preamplifier means at said input port at the frequency of said low frequency signals;
  (c) low pass filter means, disposed between said output port of said preamplifier means and said first transmission line, for permitting said low frequency signals, as amplified, to be passed from said preamplifier means to said first transmission line and DC power to be passed from said first transmission line to said preamplifier means, without allowing high frequency signals present on said first transmission line to be passed from said first transmission line to said output port of said preamplifier means; and
  (d) high frequency path means for coupling high frequency signals present on said first transmission line to said antenna without coupling to said antenna said low frequency signals applied to said first transmission line.

16. A system for coupling a radio antenna to a high frequency transmitter and a low frequency receiver over the same first transmission line so that said antenna may be simultaneously used to transmit high frequency signals and receive low frequency signals, comprising:
  (a) preamplifier means for connecting said antenna to said first transmission line, amplifying low frequency signals present at said antenna, and applying said low frequency signals, as amplified, to said first transmission line; and
  (b) high frequency path means for coupling high frequency signals present on said first transmission line to said antenna without coupling to said antenna said low frequency signals applied to said first transmission line, said high frequency path means comprising a band pass filter connected between said antenna and said first transmission line, for limiting the range of frequencies which can be coupled between said antenna and said first transmission line via said high frequency path to a predetermined range of high frequency signals.

17. The system of claim 16, wherein said band pass filter is coupled to said antenna through a first series capacitor.

18. The system of claim 17, wherein said first series capacitor has a capacitance of substantially about 3.9 picofarads or less.

19. The system of claim 16, wherein said band pass filter is coupled to said first transmission line through a second series capacitor.

20. The system of claim 16, wherein said high frequency signals are VHF communication signals and said band pass filter permits signals of approximately 150 MHz±2.5 MHz to pass therethrough with a good impedance match to said antenna and to said first transmission line.

21. A system for coupling a radio antenna to a high frequency transmitter and a low frequency receiver over the same first transmission line so that said antenna may be simultaneously used to transmit high frequency signals and receive low frequency signals, comprising:
  (a) preamplifier means for connecting said antenna to said first transmission line, amplifying low frequency signals present at said antenna, and applying said low frequency signals, as amplified, to said first transmission line, said preamplifier means including means for receiving DC power from said first transmission line;
  (b) high frequency path means for coupling high frequency signals present on said first transmission line to said antenna without coupling to said antenna said low frequency signals applied to said first transmission line;
  (c) low pass filter means, connected to said first transmission line, for coupling said low frequency signals, as amplified, from said first transmission line to a low frequency receiver, said low pass filter means including means for passing DC power for said preamplifier means to said first transmission line; and
  (d) high pass filter means, connected to said first transmission line, for coupling said high frequency signals from said transmitter to said first transmission line.

22. A system for coupling a radio antenna to a high frequency transmitter and a low frequency receiver over the same first transmission line so that said antenna may be simultaneously used to transmit high frequency signals and receive low frequency signals, comprising:
  (a) preamplifier means for connecting said antenna to said first transmission line, amplifying low frequency signals present at said antenna, and applying said low frequency signals, as amplified, to said first transmission line;
  (b) high frequency path means for coupling high frequency signals present on said first transmission line to said antenna without coupling to said antenna said low frequency signals applied to said first transmission line; and (c) a second, relatively short transmission line electrically disposed between said antenna and said high frequency path means, said high frequency path means comprising a network for matching the impedance of said second transmission line to the impedance of said first transmission line at the frequency of said high frequency signals.

23. The system of claim 22, wherein said preamplifier means has an input port for receiving signals to be amplified and an output port for outputting amplified signals, said system further comprising low frequency input network means, disposed between said second transmission line and said input port of said preamplifier means, for substantially matching the impedance of said antenna to the impedance of said preamplifier means at said input port at the frequency of said low frequency signals, said low frequency input network means having an input choke means for substantially blocking said high frequency signals.

24. A method for coupling a radio antenna to a high frequency transmitter and a low frequency receiver over the same first transmission line so that said antenna may be simultaneously used to transmit high frequency signals and receive low frequency signals, comprising:

(a) employing an amplifier to amplify low frequency signals present at said antenna and applying said low frequency signals, as amplified, to said first transmission line;

(b) coupling high frequency signals present on said first transmission line to said antenna without coupling to said antenna said low frequency signals applied to said first transmission line; and (c) filtering signals present at said antenna before applying them to said amplifier so as to permit low frequency signals present at said antenna to pass to the input of said amplifier while preventing high frequency signal present at said antenna from passing to the input of said amplifier.

25. The method of claim 24, wherein said filtering includes substantially preventing frequencies above and below a predetermined range of frequencies from passing to the input of said amplifier.

26. A method for coupling a radio antenna to a high frequency transmitter and a low frequency receiver over the same first transmission line so that said antenna may be simultaneously used to transmit high frequency signals and receive low frequency signals, comprising:

(a) employing an amplifier to amplify low frequency signals present at said antenna and applying said low frequency signals, as amplifier, to said first transmission line;

(b) coupling high frequency signals present on said first transmission line to said antenna without coupling to said antenna said low frequency signals applied to said first transmission line; and (c) filtering the output of said amplifier so as to permit said low frequency signals, as amplified, to be coupled to said first transmission line but to prohibit high frequency signals present on said first transmission line from being applied to said amplifier.

27. A method for coupling a radio antenna to a high frequency transmitter and a low frequency receiver over the same first transmission line so that said antenna may be simultaneously used to transmit high frequency signals and receive low frequency signals, comprising:

(a) employing an amplifier to amplify low frequency signals present at said antenna and applying said low frequency signals, as amplified to said first transmission line;

(b) coupling high frequency signals present on said first transmission line to said antenna without coupling to said antenna said low frequency signals applied to said first transmission line; and (c) regulating the current used by said amplifier so a to permit said amplifier to operate over a wide range of supply voltages.

28. The method of claim 27, wherein current is supplied to said amplifier over said first transmission line.

29. A method for coupling a radio antenna to a high frequency transmitter and a low frequency receiver over the same first transmission line so that said antenna may be simultaneously used to transmit high frequency signals and receive low frequency signals, comprising:

(a) amplifying low frequency signals present at said antenna and applying said low frequency signals, as amplifier, to said first transmission line;

(b) coupling high frequency signals present on said first transmission line to said antenna without coupling to said antenna said low frequency signals applied to said first transmission line;

(c) connecting a relatively short second transmission line to said antenna; and (d) matching the impedance of said second transmission line to the impedance of said first transmission line at the frequency of said low frequency signals.

30. A dual-purpose antenna system, comprising:

(a) a radio antenna having relatively low impedance at high frequencies and relatively high impedance at low frequencies;

(b) first coupling means for coupling said antenna to a first transmission line at said low frequencies, said first coupling means including amplifier means for amplifying signals at said low frequencies and means for receiving DC power from said first transmission line and applying it to said amplifier means;

(c) second coupling means for coupling said antenna to said first transmission line at said high frequencies;

(d) third coupling means for coupling said first transmission line to a low frequency radio receiver at said low frequencies, said third coupling means including means for passing said DC power to said transmission line; and (e) fourth coupling means for coupling said first transmission line to a high frequency radio transmitter at said high frequencies.

31. A dual-purpose antenna system, comprising:

(a) a radio antenna having relatively low impedance at high frequencies and relatively high impedance at low frequencies;

(b) first coupling means for coupling said antenna to a first transmission line at said low frequencies;

(c) second coupling means for coupling said antenna to said first transmission line at said high frequencies;

(d) third coupling means for coupling said first transmission line to a low frequency radio receiver at said low frequencies;

(e) fourth coupling means for coupling said first transmission line to a high frequency transmitter; and (f) second transmission line disposed between said antenna and said first and second coupling means.

32. A system for coupling a radio antenna to a high frequency receiver and low frequency receiver over the same first transmission line so that said antenna may be simultaneously used to receive high frequency signals and receive low frequency signals, comprising:
(a) preamplifier means for connecting said antenna to said first transmission line, amplifying low frequency signals present at said antenna, and applying said low frequency signals, as amplified, to said first transmission line, said preamplifier means having an input port for receiving signals to be amplified and an output port for outputting amplified signals; and
(b) high frequency path means for coupling high frequency signals present at said antenna to said first transmission line without coupling to said antenna said low frequency signals applied to said first transmission line by said preamplifier so as to prevent feedback of low frequency signals output at said output port of said preamplifier to said input port thereof.

33. A method for coupling a radio antenna to a high frequency receiver and a low frequency receiver over the same first transmission line so that said antenna may be simultaneously used to receive high frequency signals and receive low frequency signals, comprising:
(a) amplifying low frequency signals present at said antenna and applying said low frequency signals, as amplified, to said first transmission line; and
(b) coupling high frequency signals present at said antenna to said first transmission line without coupling to said antenna said amplified low frequency signals applied to said first transmission line, thereby preventing said amplified low frequency signals from producing feedback and concomitant instability.

34. A system for coupling a radio antenna to a high frequency receiver and a low frequency receiver over the same first transmission line so that said antenna may be simultaneously used to receive high frequency signals and receive low frequency signals, comprising:
(a) preamplifier means for connecting said antenna to said first transmission line, amplifying low frequency signals present at said antenna, and applying said low frequency signals, as amplified, to said first transmission line; and
(b) high frequency path means for coupling high frequency signals present at said antenna to said first transmission line to said antenna without coupling to said antenna said low frequency signals applied to said first transmission line, said high frequency path means comprising a band pass filter connected between said antenna and said first transmission line, for limiting the range of frequencies which can be coupled between said antenna and said first transmission line via said high frequency path to a predetermined range of high frequency signals.

35. The system of claim 34, wherein said band pass filter is coupled to said antenna through a first series capacitor.

36. The system of claim 35, wherein said first series capacitor has a capacitance of substantially about 3.9 picofarads or less.

37. The system of claim 34, wherein said band pass filter is coupled to said first transmission line through a second series capacitor.

38. The system of claim 34, wherein said high frequency signals are VHF communication signals and said band pass filter permits signals of approximately 150 MHz±2.5 MHz to pass therethrough with a good impedance match to said antenna and to said first transmission line.

39. A system for coupling a radio antenna to a high frequency receiver and a low frequency receiver over the same first transmission line so that said antenna may be simultaneously used to receive high frequency signals and receive low frequency signals, comprising:
(a) preamplifier means for connecting said antenna to said first transmission line, amplifying low frequency signals present at said antenna, and applying said low frequency signals, as amplified, to said first transmission line;
(b) high frequency path means for coupling high frequency signals present at said antenna to said first transmission line without coupling to said antenna said low frequency signals applied to said first transmission line; and
(c) a second, relatively short transmission line electrically disposed between said antenna and said high frequency path means, said high frequency path means comprising a network for matching the impedance of said second transmission line to the impedance of said first transmission line at the frequency of said high frequency signals.

40. The system of claim 39, wherein said preamplifier means has an input port for receiving signals to be amplified and an output port for outputting amplified signals, said system further comprising low frequency input network means, disposed between said second transmission line and said input port of said preamplifier means, for substantially matching the impedance of said antenna to the impedance of said preamplifier means at said input port at the frequency of said low frequency signals, said low frequency input network means having an input choke means for substantially blocking said high frequency signals.

41. A method for coupling a radio antenna to a high frequency receiver and a low frequency receiver over the same first transmission line so that said antenna may be simultaneously used to receive high frequency signals and to receive low frequency signals, comprising:
(a) employing an amplifier to amplify low frequency signals present at said antenna and applying said low frequency signals, as amplified, to said first transmission line;
(b) coupling high frequency signals present at said antenna to said first transmission line without coupling to said antenna said low frequency signals applied to said first transmission line; and
(c) filtering signals present at said antenna before applying them to said amplifier so as to permit low frequency signals present at said antenna to pass to the input of said amplifier while preventing high frequency signals present at said antenna from passing to the input of said amplifier.

42. The method of claim 41, wherein said filtering includes substantially preventing frequencies above and below a predetermined range of frequencies from passing to the input of said amplifier.

43. A method for coupling a radio antenna to a high frequency receiver and a low frequency receiver over the same first transmission line so that said antenna may be simultaneously used to receive high frequency signals and receive low frequency signals, comprising:

(a) employing an amplifier to amplify low frequency signals present at said antenna and applying said low frequency signals, as amplified, to said first transmission line;
(b) coupling high frequency signals present at said antenna to said first transmission line without coupling to said antenna said low frequency signals applied to said first transmission line; and
(c) regulating the current used by said amplifier so as to permit said amplifier to operate over a wide range of supply voltages.

44. The method of claim 43, wherein current is supplied to said amplifier over said first transmission line.

45. A method for coupling a radio antenna to a high frequency receiver and a low frequency receiver over the same first transmission line so that said antenna may be simultaneously used to receive high frequency signals and to receive low frequency signals, comprising:
(a) amplifying low frequency signals present at said antenna and applying said low frequency signals, as amplified, to said first transmission line;
(b) coupling high frequency signals present at said antenna to said first transmission line without coupling to said antenna said low frequency signals applied to said first transmission line;
(c) connecting a relatively short second transmission line to said antenna;
(d) matching the impedance of said second transmission line to the impedance of said first transmission line at the frequency of said low frequency signals.

* * * * *